United States Patent

[11] 3,589,768

| [72] | Inventor | James D. Wilson |
| | | Long Beach, Calif. |
| [21] | Appl. No. | 833,542 |
| [22] | Filed | June 16, 1969 |
| [45] | Patented | June 29, 1971 |
| [73] | Assignee | Banner Metals, Inc. |
| | | Compton, Calif. |

[54] DELIVERY TRUCK TRAY SAFETY LOCKING MECHANISM
5 Claims, 3 Drawing Figs.

[52] U.S. Cl. ................................................ 296/24, 214/504
[51] Int. Cl. .............................................. B62d 33/08
[50] Field of Search ................................... 296/24, 21, 22, 63; 280/179; 214/504

[56] References Cited
UNITED STATES PATENTS
| 2,608,420 | 8/1952 | Eck | 296/24 X |
| 2,626,165 | 1/1953 | Snyder | 296/24 X |

Primary Examiner—Philip Goodman
Attorney—Jessup & Beecher

ABSTRACT: A safety locking mechanism is provided for use in bakery delivery trucks, or the like, of the "walk-in" type; and in which trays of bakery products are supported in a generally horizontal, stacked condition in racks in the back of the truck. The safety locking mechanism of the invention includes a hinged safety bar which holds elongated vertical hinged members in a "closed" position to prevent the trays from sliding forward off the rack and into the cab of the truck, and which includes a control handle which must be actuated to place the aforesaid members in their closed position before the driven can take his place in the driver's seat.

INVENTOR:
James D. Wilson

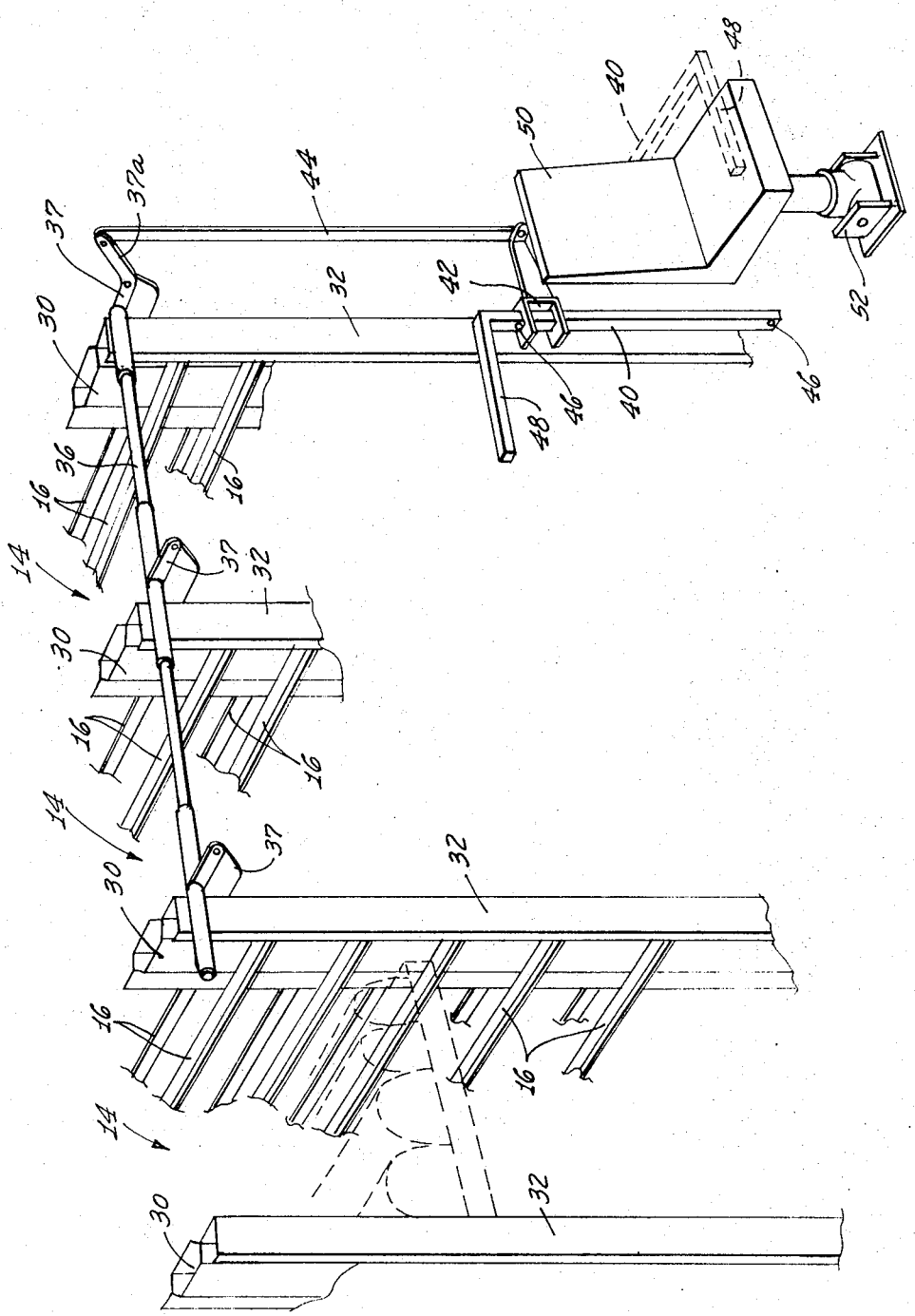

DELIVERY TRUCK TRAY SAFETY LOCKING MECHANISM

BACKGROUND OF THE INVENTION

Walk-in delivery trucks are well known which include racks in which, for example, trays of bakery products are supported on horizontal rails in the back of such trucks. It is usual in this type of truck for the rack to permit the trays to be loaded or unloaded by the driver either through doors at the rear of the truck, or through the cab in the front of the truck. This permits the truck to be loaded from the rear, for example, and for the trays to be conveniently removed from the forward cab of the truck at each delivery stop.

It is well known to the art for trucks of the type described above to be provided with vertical elongated stop members which are hinged to the forward stanchions of the rack. These stop members may be swung out to a closed position at which they prevent the trays from sliding forward off the rack and into the cab, in the presence of abrupt halts of the truck. The stop members serve to prevent injury to the driver and damage to the bakery products carried by the trays.

A problem that has arisen, however, in the case of the prior art hinged stop members, is that often the driver does not bother to check whether the stop members are all locked in their closed position before he starts his truck. This creates the aforesaid hazard in that the trays are liable to slide forward into the cab should he stop the truck abruptly. In an attempt to solve the problem of forgetful drivers, some companies have installed electric switches adjacent the stop members and which are actuated only when the stop members all are closed and locked. These switches are connected in series with the ignition system of the truck, so that the vehicle cannot be started unless all the stop members are closed and locked.

However, when the prior art arrangement described in the preceding paragraph was put to practice, an inherent disadvantage was the fact that the truck ignition system was turned off each time the stop members were released and opened to permit the trays to be removed through the cab of the truck. This was objectionable to the driver, especially in cold weather, since he would prefer to keep his engine running so as to maintain the interior of the cab at a warm temperature. For that reason, many drivers in the past have used jumpers around the aforesaid switches, thus destroying the safety feature attempted to be achieved by the prior art system.

Other prior art systems have used buzzers and warning lights which become energized whenever the stop members are moved to an open position, or when the truck is started before the stop members are closed. These latter alarms, however, have proven to be a source of irritation and annoyance to the drivers, and it has been the usual practice for the drivers to deactivate the alarm elements in one way or another.

The mechanism of the present invention is purely mechanical, and it does not involve electric switches, lights, buzzers, or the like. Nor is there any need for the driver to turn off his ignition for each delivery stop, when the mechanism of the present invention is installed in his truck. In the practice of the present invention, a mechanical linkage is used which acts to lock the aforesaid hinged stops in their closed conditions.

The linkage of the invention includes a handle which is operated by the driver in order either to place the locking mechanism in a condition in which the stop members are locked in their closed condition, or in a condition in which the stop members may be freely opened to permit the trays to be removed. When the handle is moved to place the locking mechanism in the latter condition, it is turned down over the driver's seat, and remains in that condition so long as the stop members may be freely open. As long as the handle is in the aforesaid position across the driver's seat, the driver cannot get into the seat.

Specifically, before the driver can sit in the driver's seat and operate the vehicle, the hinged stop members must all be moved to their closed position, and the aforesaid handle must be moved up and out of the driver's seat to a position in which all the stop members are closed and locked. Only then can the driver get into the driver's seat and operate the vehicle. In this way, the driver is assured that all the trays are locked in the rack before he starts the vehicle.

The operation of the locking mechanism of the invention is simple and does not constitute an annoyance to the driver. The driver merely gets out of the driver's seat at each delivery stop, and moves the control handle down over the seat to release the stop members so that they can be opened and the trays removed from the front of the vehicle. Then, when the delivery is completed, the driver merely moves the stop members to their closed position, and moves the control handle up away from the driver's seat thereby locking the stop members in their closed state, and freeing the seat for occupancy.

The structure of the present invention provides a simple means for assuring that under no conditions will the delivery truck be started and moved until the stop members are all closed and safely locked in place. At the same time, this assurance is achieved without any undue inconvenience or annoyance to the driver. Moreover, the mechanism and structure of the invention is virtually tamperproof, and there is no easy way to render it ineffective.

BRIEF DESCRIPTION OF THE DRAWINGS

FIG. 3 is a perspective diagrammatic representation of one embodiment of the improved locking mechanism of the invention.

DETAILED DESCRIPTION OF THE ILLUSTRATED EMBODIMENT

Figure 1:
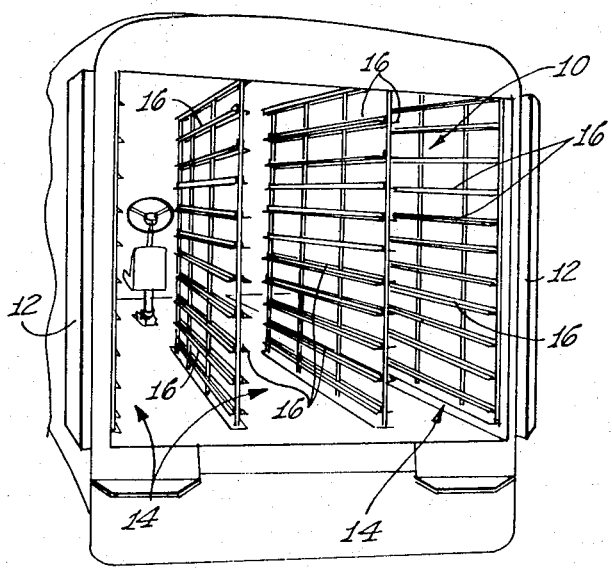
FIG. 1 is a rear view of a typical delivery truck in which the locking mechanism of the invention may be incorporated.

A bakery delivery truck 10 is shown in FIG. 1, which has usual rear doors 12, and which may be opened to reveal a rack 14. The rack 14 in the particular truck of FIG. 1 has three adjacent sections, with each section being equipped with horizontal rails 16, the rails serving to support trays, for example, of bakery goods, in adjacent vertical stacks.

Figure 2:
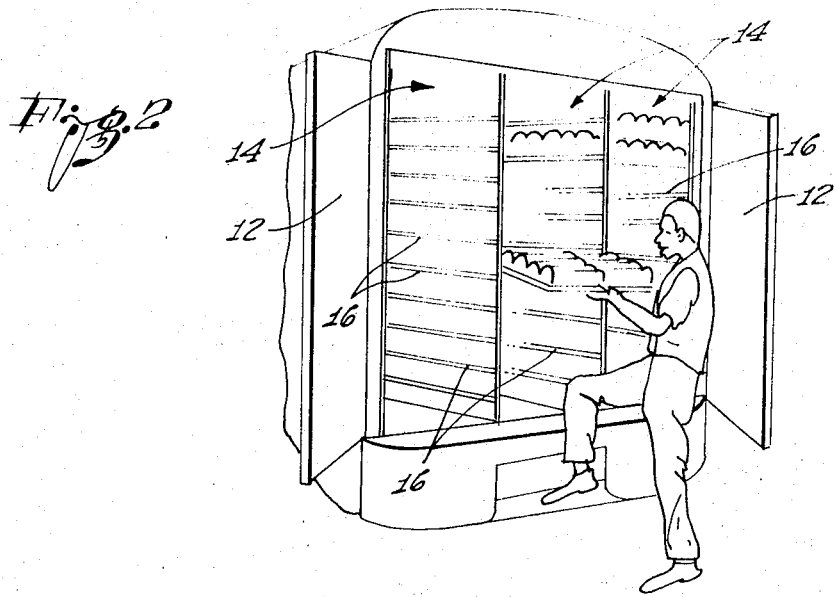
FIG. 2 is a partial rear view of the truck showing the manner in which trays may be loaded into racks in the rear of the truck.

As shown in FIG. 2, for example, the trays may conveniently be inserted into the racks from the rear of the truck, and through the rear doors 12. The racks extend completely around the rear part of the truck to the forward cab, as shown in FIG. 1. This latter feature permits the driver to enter the rear part of the truck from the cab directly, and to remove the trays from the forward end of the rack and carry them through his cab. This serves as a convenient means for the driver to remove the trays from the truck at the various delivery stops.

As described above, unless some means is provided to stop the trays, they will have a tendency to slide forward and into the cab, especially during abrupt stops of the vehicle.

As shown in FIG. 3, for example, the horizontal rails 16 of the racks 14 are supported by forward stanchions 30 adjacent the rear of the forward cab. In order to prevent the forward movement of the trays, vertical, elongated stop members 32 are hinged to the stanchions 30. When the elongated stop members are in the closed position shown in FIGS. 1 and 3, they extend partially across the end of one side of the individual racks, so that the trays supported on the rails 16 are prevented from sliding forward into the cab of the vehicle. The stop members 32 are held in the closed position by means, for example, of a horizontal bar 36.

The horizontal bar 36 has radial crank arms 37 attached to it, and these crank arms are pivoted to the stanchions 30 on appropriate supports 38 which, in turn, may be welded, or otherwise attached to the individual stanchions. The bar 36 is rotatable about the pivotal axis of the crank arms, to the illustrated position in FIG. 3, in which it is directly adjacent the vertical stop members 32, so that the stop members are locked in their closed position and prevent the trays from sliding forward off the rails 16. The bar 36 may also be turned about the pivotal axis out to a position spaced horizontally from the stop members 32, and in which the vertical stop members 32 may be freely turned about their respective vertical axes to an open position, to permit the trays to be moved out through the forward ends of the racks and through the cab.

A handle 40, in the form of an elongated L-shaped tubing or bar is slidable in a tubing or socket 42 which, in turn, is pivotally mounted on the lower end of a vertical strip 44. The upper end of the strip 44 is pivotally coupled to an extension 37a of one of the crank arms 37. Transverse stop pins 46 may be mounted at the upper and lower ends of the bar 40. The bar 40 has an L shape to define a handle 48.

As shown, the handle 40 is directly adjacent the driver's seat 50. The driver's seat may be of the type which is pivotally mounted in a bracket 52 on the floor of the cab. When a delivery stop is reached, and in order to permit removal of the trays from the forward end of the rack 14, the driver pulls the handle 48 of the bar 40 upwardly to slide the bar up in the socket 42. The bar 40 is then turned to a horizontal position and pushed down to the position shown in the broken line in FIG. 3. This causes the bar 36 to move about the aforesaid pivotal axis and assume its spaced position from the vertical stop member 32. The stop members 32 may then be freely opened, so as to permit the removal of selected trays by the driver for delivery.

So long as the locking mechanism is in the position in which the trays may be removed, the bar 40 must be in the position shown by the broken line in FIG. 3, in which it extends directly over the position normally occupied by the driver in the seat 50. When the driver enters the cab, and before he can occupy the seat, he must move the bar 40 up away from the position shown by the broken line, and to its vertical position shown in FIG. 3, thereby closing members 32. Only then can the seat 50 be occupied by the driver, so that the truck may be operated.

It will be appreciated that the mechanism of the invention is eminently simple, and it is rugged and virtually tamperproof. Also, the mechanism is easy and convenient to operate, since all that is required of the driver is that he grasp the handle 48 to move the handle and bar 40 up and over to the position shown by the broken lines. Then, his trays are freely accessible. On his return, all that he need do is lift the handle 48 and bar 40 up and out of the way. The apparatus is completely foolproof, since it is virtually impossible to operate the vehicle until the stop members have all been closed and the locking mechanism has safely been set to its locking position.

What I claim is:

1. In a delivery truck, or the like, which includes a rear section and a forward cab, and which has a rack in said rear section for supporting trays in a horizontal stacked condition on horizontal rails, and which has a driver's seat in the forward cab; the combination of: at least one stop member movable between an open position in which the trays may be slid forward on said rails and into the forward cab for removal from the truck, and a closed position in which the trays are prevented from sliding forward off said rails; and a manually actuable locking mechanism movable to a first position in which the stop member is held thereby in its closed position and to a second position in which said stop member may be freely opened; an actuating member for said locking mechanism and movable to place said locking mechanism selectively in said first and second position; and a handle mechanically coupled to said movable member and positioned adjacent said seat and movable to a position over the front of said seat thereby impeding occupancy of the aforesaid driver's seat when said locking mechanism is placed thereby in its second position, and movable to a position clear of the driver's seat when said locking mechanism is placed thereby in its first position.

2. The combination defined in claim 1, in which said rack has a plurality of forward stanchions adjacent said forward cab, and said stop member comprises a vertical elongated member hinged to one of said forward stanchions.

3. The combination defined in claim 2, and which includes a plurality of such elongated vertical stop members hinged to respective ones of said stanchions.

4. The combination defined in claim 3, in which said locking mechanism includes a horizontal bar pivotally attached to said stanchions and extending across said vertical stop members, said bar being pivotally movable to a position directly adjacent said stop members to hold such stop members in their closed position and to a position spaced from said stop members to allow said stop members to be swung open thereby to permit the removal of the aforesaid trays.

5. The combination defined in claim 4, in which said handle comprises an elongated L-shaped member slidably mounted in a further member pivotally coupled to one end of said horizontal bar, so that actuation of the handle causes the bar to turn about a pivotal axis to assume the aforesaid adjacent position with respect to said vertical stop members for one position of said handle and to assume the aforesaid spaced position with respect to said vertical stop members for a second position of said handle.